United States Patent [19]

Winland et al.

[11] Patent Number: 4,697,611
[45] Date of Patent: Oct. 6, 1987

[54] DEVICE AND METHOD FOR RESTRICTING GAS FLOW

[75] Inventors: Virgil L. Winland, Westerville; James J. Matyskella, Columbus, both of Ohio

[73] Assignee: Worthington Cylinder Corporation, Columbus, Ohio

[21] Appl. No.: 841,434

[22] Filed: Mar. 19, 1986

[51] Int. Cl.⁴ .................. F16K 47/08; F15D 1/02; B65D 83/14
[52] U.S. Cl. ...................... 137/14; 251/118; 251/144; 138/44; 29/511; 29/157 C; 141/2; 141/325; 239/600
[58] Field of Search ............. 239/600; 137/14; 222/3; 141/18, 325, 2; 251/144, 118; 29/511, 157 C; 138/44

[56] References Cited

U.S. PATENT DOCUMENTS

| | | | |
|---|---|---|---|
| 783,024 | 2/1905 | Cox, Jr. | 251/144 |
| 1,974,027 | 7/1934 | Knick . | |
| 2,487,129 | 11/1949 | Hallock | 29/511 X |
| 2,631,659 | 3/1953 | Wright | 138/44 X |
| 3,174,455 | 3/1965 | Peterson . | |
| 4,139,160 | 2/1979 | Rood | 239/600 |
| 4,157,163 | 6/1979 | Pinto et al. | 239/600 X |
| 4,168,015 | 9/1979 | Robinette . | |
| 4,311,450 | 1/1982 | Camos . | |
| 4,401,272 | 8/1983 | Merton et al. . | |
| 4,526,593 | 7/1985 | Meyerson . | |

FOREIGN PATENT DOCUMENTS 567093 12/1932 Fed. Rep. of Germany ...... 251/144

Primary Examiner—Arnold Rosenthal
Attorney, Agent, or Firm—Fay, Sharpe, Beall, Fagan, Minnich & McKee

[57] ABSTRACT

Restricting outlet fluid flow from a pressure vessel includes an inlet/outlet member having a passage of predetermined dimension communicating with the pressure vessel. The pressure vessel is initially filled with fluid through the passage at a first flow rate. A restrictor is adapted for close receipt in the inlet/outlet member passage and includes an opening having a dimension substantially less than the inlet/outlet member passage. An outer end of the inlet/outlet member is thereafter deformed to retain the restrictor insert within the passage. Fluid flow released from the pressure vessel must exit through the restrictor opening at a second flow rate substantially less than the inlet first flow rate.

4 Claims, 4 Drawing Figures

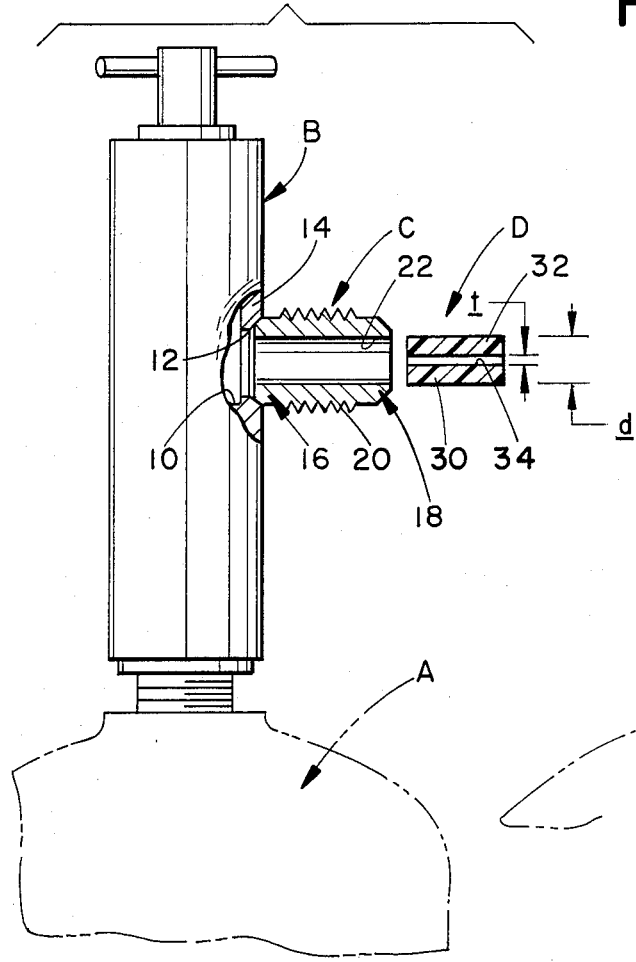
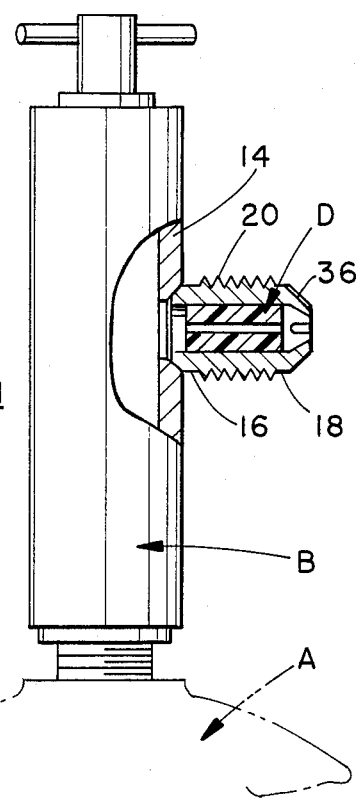
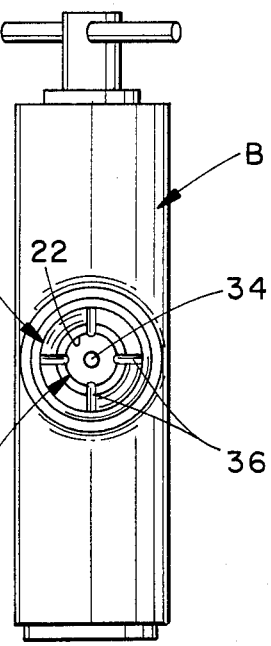
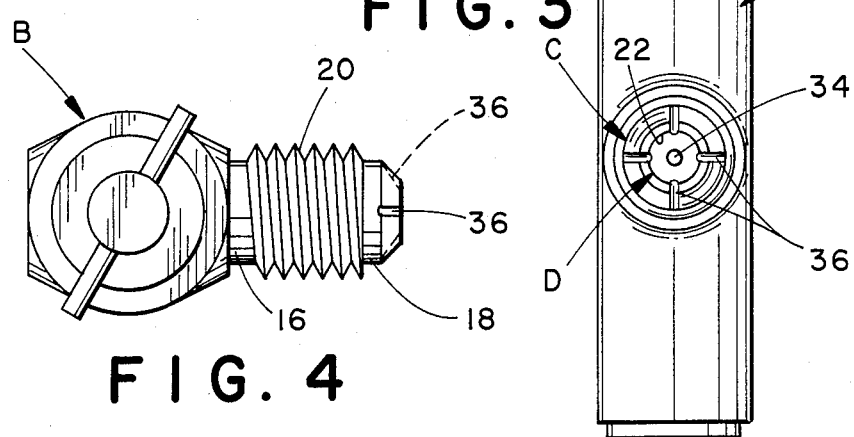

DEVICE AND METHOD FOR RESTRICTING GAS FLOW

BACKGROUND OF THE INVENTION

This invention pertains to the art of flow control devices for fluids and, more particularly, to a device for restricting the flow of gas from a pressure vessel or the like. The invention is particularly applicable to a pressurized cylinder and will be described with particular reference thereto. However, it will be appreciated that the invention has broader applications and may be advantageously employed in other environments and applications.

Disposable compressed gas cylinders are frequently used in containing refrigerant gases or the like. A flow control device maintains a substantially constant rate of fluid flow from the compressed gas cylinders so that transformation of these disposable cylinders to alternate uses has met with only limited success. For example, the cylinders may be filled with alternate gases and operation of the valve permits a flow of gas at a predetermined pressure and flow rate therefrom. In many instances, the flow passage utilized in the refrigerant gas industry defines a flow rate that varies from the requirements of these alternate uses. It has, therefore, been considered desirable to develop a means of restricting the flow of gas from the cylinder without replacing the entire valve that is sealingly secured to the cylinder.

More importantly, a flow restrictor must be of simple construction and adapted for quick and easy installation in the field. In order to maximize economic costs, the pressure cylinder must be filled in a relatively short period of time, thus necessitating an enlarged flow passage to accommodate a large flow rate. This same cylinder must then b adapted with the flow rstrictor device for subsequent fluid release from the vessel at a second, reduced flow rate. Additionally, the flow restrictor must not be easily removed in the field. A flow restrictor device and method of installing same that satisfies these and other requirements and overcomes the above-noted deficiencies is deemed to be provided by the subject invention.

SUMMARY OF THE INVENTION

In accordance with a method for restricting fluid flow, a pressure vessel is supplied with a valve having open and closed positions and an inlet/outlet member having a passage of predetermined dimension communicating with the valve. The pressure vessel is filled with fluid through the passage at a first flow rate. An elongated restrictor is adapted for close receipt in the inlet/outlet member passage. The restrictor includes an opening having a dimension substantially less than the passage predetermined dimension thereby limiting fluid flow therethrough. One end of the inlet/out member passage is deformed to retain the restrictor in the passage. Thereafter, fluid is released from the pressure vessel through the passage at a second flow rate that is substantially less than the first flow rate.

In accordance with a further aspect of the method, the deforming step includes forming chamfered edges at preselected areas on the inlet/outlet member.

In accordance with a still further aspect of the invention, the deforming step includes cross staking one end of the inlet/outlet member.

The principle advantage of the subject invention resides in the simplified installation of a flow restrictor in the field.

In accordance with another advantage of the subject invention, a pressure vessel may be filled at a first flow rate and fluid released from the vessel through the same passage at a second flow rate substantially less than the first flow rate.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein:

FIG. 1 a side elevational view of the pressure vessel and valve assembly and a flow restrictor prior to installation in an inlet/outlet member;

FIG. 2 is a side elevational view of the pressure vessel and valve assembly incorporating the flow restrictor therein; and, FIG. 3 is a plan elevational view of the assembly as viewed from the right side of FIG. 2.

FIG. 4 is an overhead view of the valve assembly particularly illustrating the chamfered edge of the inlet/outlet member.

DETAILED DESCRIPTION OF THE PREFERRED EMBODIMENT AND METHOD

Referring now to the drawings wherein the showings are for purposes of illustrating the preferred embodiment and method of the invention only and not for purposes of limiting same, the FIGURES show a conventional pressure vessel A having a valve body B and an inlet/outlet member C. Any conventional pressure vessel or on/off valve member may be utilized and further discussion of their detailed construction is deemed unnecessary toa complete understanding of the invention.

The valve body B is sealingly secured to the pressure vessel in a manner to prevent removal therefrom. A conventional valve member selectively cooperates with a valve seat in the body. The valve member and valve seat (not shown) operate to control fluid flow inlet and outlet with the pressure vessel. An internal passage 10 operatively communicates with the valved pressure vessel. The internal passage 10 extends through a valve body sidewall 14 allowing fluid flow from the inlet/outlet member C through the valve body to the pressure vessel A and vice versa. The internal passage communicates with a tapered opening 12 through the sidewall 14 of the valve body.

The flare outlet or inlet/outlet member C is of generally elongated, clindrical conformation and has a first or inner end 16 received in the tapered opening of the valve body. A second or outer end 18 is spaced outwardly from the valve body for communication with an associated structure (not shown). The inlet/outlet member further includes an external threaded region 20 that cooperates with an associated female coupling of the associated structure. This provides a secure, sealed connection with the associated structure for filling or releasing fluid from the pressure vessel.

The inlet/outlet member further includes an elongated central passage 22 extending from the inner end 16 to the outer end 18. The central passage has a first predetermined dimension generally designated d. This dimension is sufficiently great to allow inlet of fluid at a first flow rate $Q_1$ (FIG. 1) therethrough such that the pressure vessel may be filled in a relatively short period of time.

A restrictor insert D is also of generally elongated, cylindrical conformation having a first end 30 and a second end 32. The restrictor insert has an outer dimension closely approximating the passage dimension d. In the preferred embodiment, the passage 22 is generally circular in cross-section such that passage dimension d is the diameter of the passage and, likewise, the restrictor insert outer dimension defines its outer diameter. It is to be appreciated that various other configurations may be used without departing from the overall intent and scope of the present invention. Close tolerances between these dimensions permit the restrictor insert to be closely received in the central passage of the inlet/outlet member. A central bore or opening 34 extends from the first end 30 to the second end 32 of the restrictor insert accommodating fluid flow therethrough. This opening is substantially smaller than the passage diameter d having a dimension generally designated t. A second reduced flow rate $Q_2$ (FIG. 2) is provided by the restrictor insert thereby limiting the release of fluid from the pressure vessel A.

As indicated above, the pressure vessel is originally filled at a flow rate $Q_1$ through central passage 22 of the inlet/outlet member and through the open valve member (not shown) in the absence of any restrictor construction. Oftentimes, releasing the fluid from the pressure vessel permits a flow of gas at a far greater rate than required. Positioning the restrictor insert D within the central passage 22 of the inlet/outlet member once the valve member is closed establishes a reduced gas flow $Q_2$ upon reopening the valve member that is conducive to other applications.

The close dimensional relationship between the outer diameter of the restrictor insert and the passage diameter d, provides a press fit engagement therebetween. Nevertheless, the press fit engagement does not adequately maintain the restrictor insert in position under fluid pressure conditions. An axial force is exerted on the first end 30 of the restrictor insert due to the cross-sectional area defined between dimensions d and t. This force tends to push the restrictor insert D out of passage 22.

A quick, efficient manner of retaining the restrictor insert within the central passage is provided by the subject invention. More particularly and with the valve member in a closed position, the second or outer end 18 of the inlet/outlet member is cross staked thereby deforming the inlet/outlet member and preventing the restrictor insert from exiting the outer end 18. A special tool is utilized to cross stake and form radially extending chamfers 36 (FIGS. 3 and 4). The radially extending chamfers are positioned at predetermined, circumferentially spaced areas on the inlet/outlet member. In the preferred embodiment, four such chamfers are equally spaced about the circumference of the outer end 18. A greater or lesser number at various spaced relationships may be effectively used without departing from the scope and spirit of the subject invention. Other configurations, though, would necessarily require that the deformed outer end 18 extend radially inward to an area disposed between the passage diameter d and the central opening 34.

It is appreciated that such a configuration effectively limits axial movement of the restrictor insert in the centreal passage 22 and yet has little, if any, effect on fluid flow through the central passage 22. With the insert in place and reopening the valve member, the flow $Q_2$ of fluid exiting the pressure vessel is greatly diminished due to the reduced orifice in the restrictor insert. Obviously, the rate of flow is adjustable by changing the size of the orifice in the restrictor insert prior to installing it in the inlet/outlet member.

The inlet/outlet member and restrictor insert may be formed from a wide range of materials that are advantageously used to accommodate a variety of environments. In the preferred embodiment, the inlet/outlet member and the restrictor insert are both formed of a polymer material. The polymer construction is sufficiently rigid to withstand encountered fluid pressures and deformable enough to form chamfers 36 in the outer end.

The invention has been described with reference to the preferred embodiment and method. Obviously, modifications and alternations will occur to other upon a reading and understanding of this specification. It is intended to include all such modifications and alterations insofar as they come within the scope of the appended claims or the equivalents thereof.

Having thus described the invention, it is now claimed:

1. A method for restricting outlet fluid flow in a passage comprising the steps of:
   providing a pressure vessel adapted with a valve regulating fluid flow, said pressure vessel having an inlet/outlet member including a passage of predetermined dimension communicating therewith;
   filling said pressure vessel with fluid through said passage at a first flow rate;
   supplying an elongated restrictor adapted for close receipt in said inlet/outlet member passage, said restrictor including an opening having a dimension substantially less than said passage predetermined dimension for limiting fluid flow therethrough;
   placing said restrictor into engagement with said inlet/outlet member passage in the absence of fluid flow therethrough;
   deforming one end of said inlet/outlet member passage to retain said restrictor in said passage, said deforming step including cross-staking one end of said inlet/outlet member; and,
   releasing fluid from said pressure vessel through said passage and said restrictor opening at a second flow rate, said second flow rate being substantially less than said first flow rate.

2. The method as defined in claim 1 wherein said deforming step includes forming chamfered edges at preselected areas on one end of said inlet/outlet member.

3. The method as defined in claim 1 wherein said deforming step includes forming chamfered edges extending radially inward to a third dimension interposed between said passage predetermined dimension and said opening dimension.

4. The method as defined in claim 1 wherein said restrictor placing step includes press fitting said restrictor into engagement with said inlet/outlet member passage.

* * * * *